April 10, 1951  A. A. MONSON  2,548,613
CABLE CONTROLLED DUMP BOX
Filed June 11, 1947  2 Sheets-Sheet 1
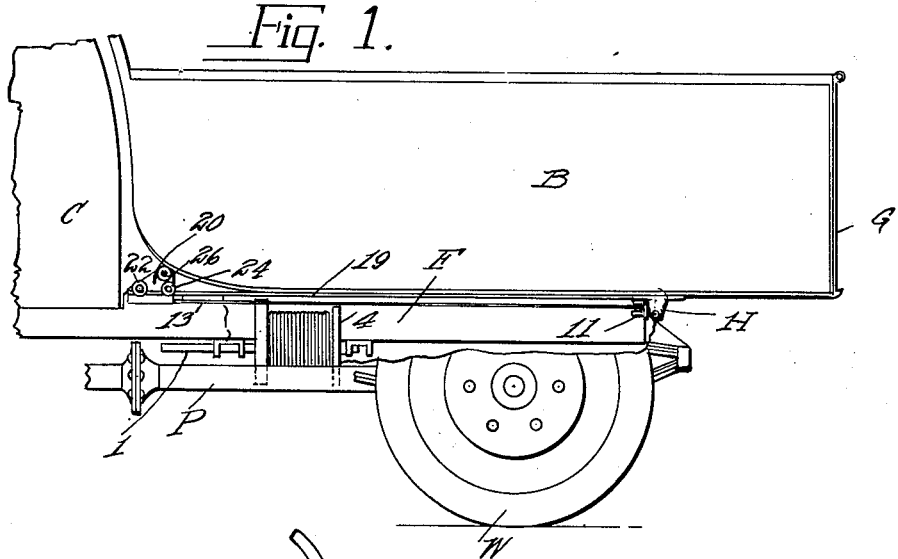
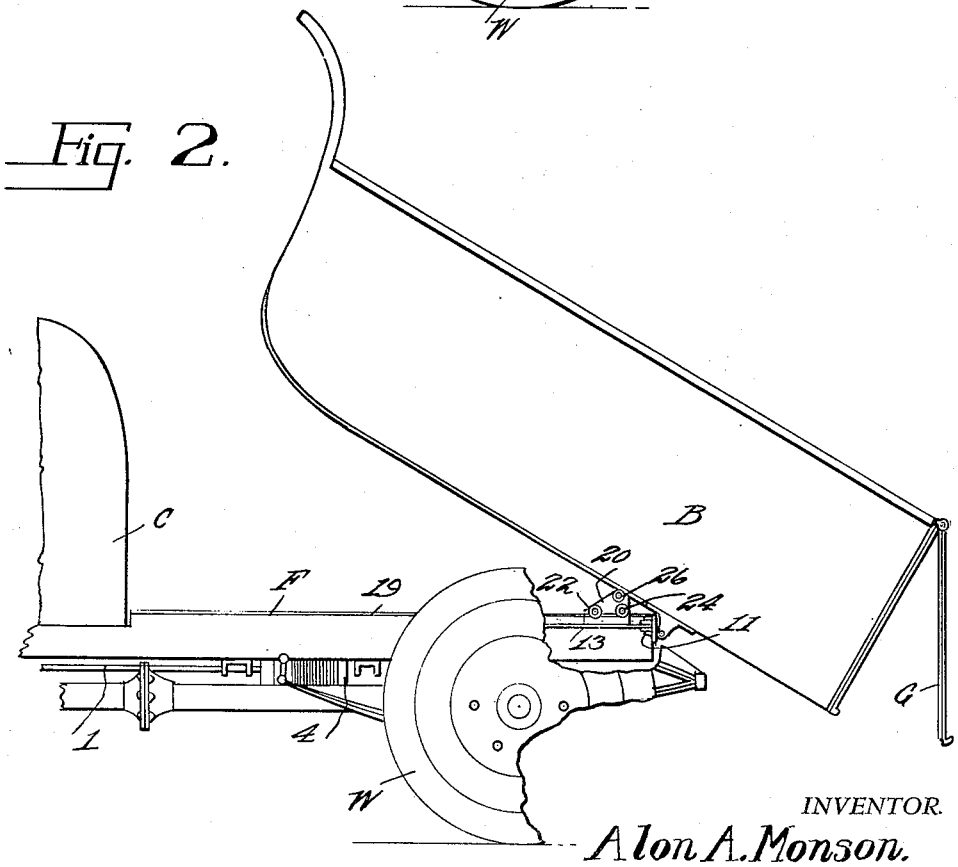
INVENTOR.
Alon A. Monson.
BY Victor J. Evans & Co.
ATTORNEYS April 10, 1951  A. A. MONSON  2,548,613
CABLE CONTROLLED DUMP BOX
Filed June 11, 1947  2 Sheets-Sheet 2
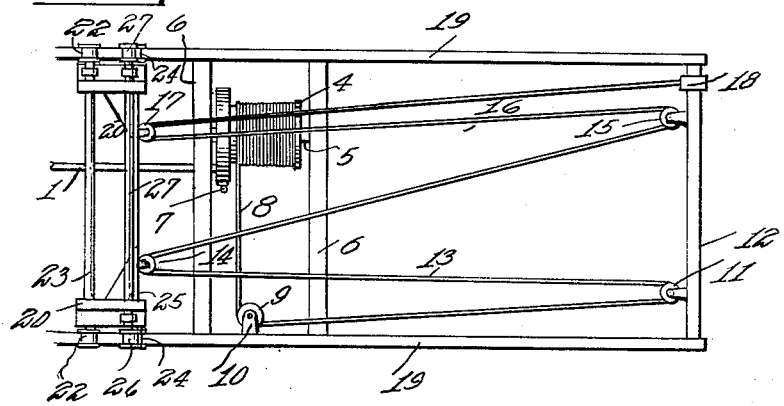
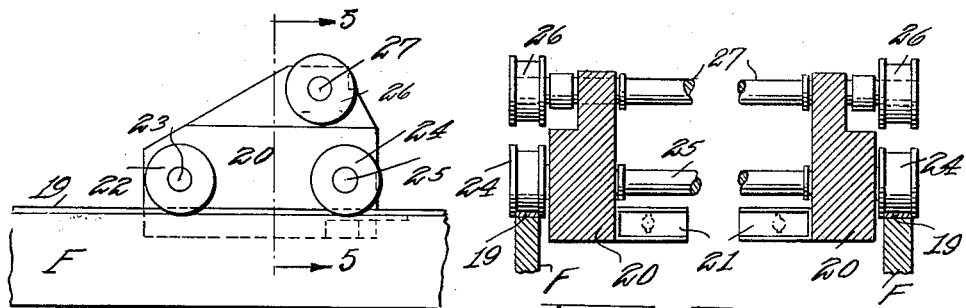
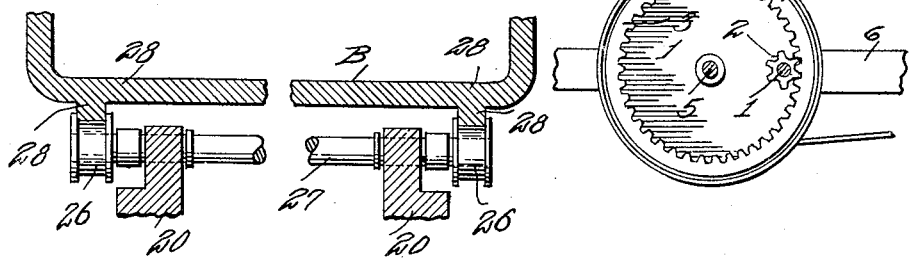
INVENTOR.
*Alon A. Monson*
BY *Victor J. Evans & Co.*
ATTORNEYS Patented Apr. 10, 1951

2,548,613

UNITED STATES PATENT OFFICE 2,548,613

CABLE CONTROLLED DUMP BOX

Alon A. Monson, Livingston, Mont.

Application June 11, 1947, Serial No. 753,849

1 Claim. (Cl. 298—21)

The present invention relates generally to land vehicles of the dumping type having a tiltable body and operating mechanism taking power from a motor on the automotive vehicle, and more specifically to an improved cable controlled dump box which while especially designed for use on automotive trucks and similar vehicles, is equally well adapted as a stationary dumping mechanism for handling various materials.

In the preferred form of the invention illustrated in the drawings the invention is embodied in an automotive dump truck having a hinged tiltable body which is raised or elevated for emptying a load by a cable operated traveling elevator or carriage, and the empty tilted body is restored to initial position by a reverse movement of the elevator or carriage. The equipment for carrying out these operations in co-action with the frame of the truck and the tiltable dumpbody of the truck is composed of a minimum number of standardized parts which may with facility be manufactured at low cost of production, assembled with convenience, and installed for use on an automotive truck to insure a smooth-operating, reliable, and easily controlled operating mechanism for the dump-truck.

The invention consists in certain novel features of construction and combinations and arrangements of parts as will hereinafter be described in connection with the accompanying drawings, and more specifically set forth in the appended claim.

In the drawings I have illustrated one complete example of my invention embodied in an automotive dump truck in which the parts are combined and arranged in accord with one mode I have devised for the practical application of the principles of my invention. It will, however, be understood that changes and alterations are contemplated and may be made in these exemplifying drawings, within the scope of my claim, without departing from the principles of the invention.

Figure 1 is a view in side elevation showing so much of an automotive dump truck as is necessary to illustrate the embodiment of my invention; and Figure 2 is a similar view showing the tiltable hinged body in dumping position.

Figure 3 is a plan view, with the body of the truck omitted for convenience in illustrating the cable operating mechanism.

Figure 4 is an enlarged side view or end view of the elevator or traveling carriage supported on a frame rail or track.

Figure 5 is a vertical sectional view transversely of the truck, as at line 5—5 of Fig. 4 through the carriage and its supporting rails on the truck frame.

Figure 6 is a broken-away vertical sectional view through the bottom portion of the truck body and a portion of the carriage showing the relation of the elevating rollers of the carriage to the track rails on the under surface of the bottom of the truck body; and Figure 7 is a detail vertical sectional view, transversely of the truck showing the power transmission mechanism from the truck motor to the cable-operating drum of the dumping mechanism.

In order that the general relation and utility of parts of this specific embodiment of the invention may readily be understood I have shown an automotive dumping truck, having a tiltable body B and hinged swinging end gate G; and the tiltable body is pivotally mounted or hinged at H at the rear end of the rectangular truck-frame F. A portion of the driver's cab is shown at C, and the rear wheels W, with a portion of the propulsion housing P, are also shown.

In Figure 3 power for operating the dumping mechanism is taken off the vehicle motor by means of a longitudinally extending shaft 1 that transmits power and rotary movement through a pinion 2 (Fig. 7) to the internal gear 3 of a reversible cable drum 4 mounted on a shaft 5 extending longitudinally of the truck and journaled in bearings in the frame F, or its cross members 6. The reversible rotary cable drum is equipped with a conventional friction brake indicated at 7, and it is controlled by manually operated mechanism in usual or suitable manner for winding or unwinding the cable 8.

In Fig. 3 it will be seen that the single cable 8 is attached at one end to the drum and wound thereon, and by a zig-zag formation of its flights the cable passes around a lateral guide sheave 9 journaled at 10 in a bearing on the left side of the frame F. From the grooved sheave 9 the cable extends rearwardly to and around a rear sheave 11 journaled in a bearing on the cross bar 12 of the frame, and thence, in a loop 13 the cable extends forwardly around a movable or carriage-supported sheave 14 and rearwardly around a rear sheave 15 mounted on the cross bar 12. From sheave 15 a second loop 16 extends around another carriage supported sheave 17, and at its rear end 18 this loop is anchored to the cross bar 12 of the frame.

The carriage or elevator upon which the two movable and laterally spaced sheaves 14 and 17 are journaled is disposed transversely of the truck and it is designed to reciprocate, traveling rearwardly for up-tilting the tiltable body to discharge a load, and then forwardly to permit the empty body to be lowered by gravity to its initial horizontal position; and this rearward and forward movement of the carriage is under control of the operating cable and its manually controlled reversible drum, and braking mechanism.

In equipping a motor truck with the operating means of my invention, a track, including parallel rails 19, 19, is mounted upon the longitudinal bars of the rectangular frame F, and these traction rails which extend from the cab and terminate near the rear end of the frame, may be mounted in place in any suitable manner.

As best seen in Figs. 4, 5, and 6, the carriage, or horizontally moving elevator, includes a pair of laterally spaced supporting blocks 20, 20 that are rigidly united by a cross brace 21, and the carriage is equipped with two pairs of grooved rollers, or traction wheels, designed to roll upon the rails 19, 19, of the frame. The front pair of traction rollers, which are flanged, and designated as 22, 22, are mounted upon a cross shaft 23 journaled in bearings of the spaced blocks; and the pair of rear traction rollers 24, 24, are mounted upon a second shaft or spindle 25 journaled in bearings of the laterally spaced blocks.

The traveling elevator or carriage is also equipped with a pair of laterally spaced elevating or lifting rollers 26, 26, mounted upon spindle 27 journaled in bearings of the spaced blocks, and these elevating and lowering rollers are located in a plane above the plane of the traction rollers, in position to co-operate with the hinge joint H to maintain the body B in normal horizontal position and supported by the frame F.

The elevating and lowering rollers 26 are designed to roll under and in contact with two laterally spaced rails 28, 28, that are fashioned in suitable manner on the under face of the bottom of the body B.

From this description taken in connection with the drawings, it will be apparent that the power operated drum may be revolved to contract the two loops 13 and 16 of the cable to pull the carriage toward the rear of the truck. In its rearward movement, and by co-action of the elevating rollers 26 with the body-rails 28, the body is tilted upwardly on its hinges or pivots to the dumping position of Fig. 2. After the load is dumped, the rotation of the drum is reversed, the contracted loops of the cable are extended, and the carriage is drawn from the rear toward the front of the truck, gradually lowering the empty body to its initial horizontal position.

Having thus fully described my invention, what I claim as new and desire to secure by Letters Patent is:

In an operating mechanism for a dumping vehicle having a frame, and a tilting body hingedly connected to the rear end of the frame, traction rails on the frame and complementary elevating rails on the underside of the body, the improvement comprising a carriage having a pair of relatively spaced supporting blocks, and a cross brace joining said blocks, a pair of axles journalled in said blocks in parallel relation to each other, traction rollers on the opposite ends of said axles for engaging the traction rails on the frame, a third axle journalled in said blocks above said first pair of axles and elevating rollers on the opposite ends of said third axle for engaging the elevating rails of the body, a manually controlled reversible drum and operating means journalled on said frame at right angles to the path of travel of said carriage, a cable on said drum trained over sheaves carried by said frame and said carriage and fixed at one end to said frame so that when said drum is operated said carriage will be caused to reciprocate over said traction rails and cause said body to be raised to dumping position or lowered to load retaining position.

ALON A. MONSON.

REFERENCES CITED

The following references are of record in the file of this patent:

UNITED STATES PATENTS

| Number | Name | Date |
|---|---|---|
| 1,176,677 | Hannagan | Mar. 21, 1916 |
| 1,533,436 | Lowry | Apr. 14, 1925 |
| 2,170,932 | Venema | Aug. 29, 1939 |
| 2,299,187 | Stearns | Oct. 20, 1942 |

FOREIGN PATENTS

| Number | Country | Date |
|---|---|---|
| 344,310 | Great Britain | Mar. 5, 1931 |